US005440494A

United States Patent [19]

Akamaru

[11] Patent Number: 5,440,494

[45] Date of Patent: Aug. 8, 1995

[54] APPARATUS FOR AUTOMATIC REMODELLING OF ARTICLE PROCESSING SYSTEM

[75] Inventor: Hidefumi Akamaru, Ishikawa, Japan

[73] Assignee: Shibuya Kogyo Co., Ltd., Kanazawa, Japan

[21] Appl. No.: 266,091

[22] Filed: Jun. 24, 1994

Related U.S. Application Data

[63] Continuation of Ser. No. 935,546, Aug. 26, 1992, abandoned.

[30] Foreign Application Priority Data

Sep. 3, 1991 [JP] Japan .................................. 3-250439
Mar. 6, 1992 [JP] Japan .................................. 4-084566

[51] Int. Cl.[6] .................................. G05B 19/18

[52] U.S. Cl. .................................. 364/468; 364/474.11; 364/131

[58] Field of Search .............. 364/468, 474.11, 474.21, 364/131, 132; 53/283, 306, 319, 471; 99/450.4

[56] References Cited

U.S. PATENT DOCUMENTS

| | | | |
|---|---|---|---|
| 4,114,524 | 9/1978 | Welch | 99/450.4 |
| 4,472,783 | 9/1984 | Johnstone et al. | 364/474.11 |
| 4,473,883 | 9/1984 | Yoshida et al. | 364/474.21 |
| 4,481,753 | 11/1984 | Rutter et al. | 53/471 |
| 4,506,489 | 3/1985 | Schieser et al. | 53/283 |
| 4,564,102 | 1/1986 | Mori et al. | 364/474.11 |
| 4,580,207 | 4/1986 | Arai et al. | 364/474.11 |
| 4,841,431 | 6/1989 | Takagi et al. | 364/474.11 |
| 4,858,101 | 8/1989 | Stewart et al. | 364/131 |
| 5,097,587 | 3/1992 | Yasuda | 364/474.21 |
| 5,121,331 | 6/1992 | Lovrenich | 364/474.11 |

FOREIGN PATENT DOCUMENTS

| | | |
|---|---|---|
| 59-42399 | 11/1984 | Japan . |
| 3-43395 | 2/1991 | Japan . |
| 3-88612 | 4/1991 | Japan . |
| 3-162207 | 7/1991 | Japan . |

*Primary Examiner*—James P. Trammell
*Attorney, Agent, or Firm*—Flynn, Thiell, Boutell & Tanis

[57] ABSTRACT

An apparatus for automatic remodelling of an article processing system which may be provided with a filler A and a capper B, for example, inhibits the operation of the article processing system unless a remodelling operation of all the article processing arrangements have taken place in a normal manner. When the variety of an article is changed, and therefore a remodelling operation is required, a main controller provides a signal designating the variety of another article to each of sub-controllers associated with the filler and the capper. The sub-controller associated with the filler selects remodelling data which corresponds to the variety of the article, and controls an associated drive arrangement in accordance with such data to move a remodelling arrangement to a given position. When the movement of all the remodelling arrangements to given positions is detected by a detecting arrangement, a remodelling complete signal is delivered from the respective sub-controllers to the main controller. A similar operation takes place also in the capper, and when the remodelling complete signals are received by the main controller from all of the sub-controllers, the operation of the article processing system is enabled.

13 Claims, 1 Drawing Sheet

APPARATUS FOR AUTOMATIC REMODELLING OF ARTICLE PROCESSING SYSTEM

This application is a continuation of U.S. Ser. No. 07/935,546, filed Aug. 26, 1992 now abandoned.

FIELD OF THE INVENTION

The invention relates to an article processing system which may be provided with a filler or capper, for example, and more particularly, to an apparatus for automatic remodelling of the system in which such filler or capper is changed in accordance with articles to be processed.

DESCRIPTION OF THE PRIOR ART

An article processing system is well known in the art including a filler which fills an article supplied thereto with a liquid to be filled therein, and a capper located downstream of the filler to perform a capping of the filled article in an article processing system of the kind described. A main controller is provided to control the operation of the filler or capper.

It is a feature of the article processing system of the kind described that a variety of articles can be processed as a normal practice. When the variety of the article is changed, various parts of the filler or capper are remodelled either manually or automatically in accordance with the size of another article.

In the prior art practice, the remodelling operation, even if it takes place automatically, must be conducted separately for each filler or capper. Should a wrong remodelling take place, for example, if a remodelling of a filler takes place so as to fit a first variety of article while a remodelling of the capper takes place so as to correspond to a second variety of article, such mistake cannot be revealed unless and until the article processing system is set in operation and another article is conveyed to a wrong remodelled position.

SUMMARY OF THE INVENTION

In view of the foregoing, it is an object of the invention to provide an apparatus for automatic remodelling of article processing system which inhibits the operation of the article processing system if a wrong remodelling is included in part of the article processing system or unless the remodelling operation takes place in a normal manner for the entire system.

The invention relates to an article processing system including a first article processing means which processes an article supplied thereto, a second article processing means located downstream of the first article processing means for processing the article supplied from the first processing means, and a main controller for controlling the operation of the first and the second article processing means.

According to a first feature of the invention, the first article processing means comprises first remodelling means movable to a position which corresponds to the size of an article, first drive means for moving the first remodelling means to a given position which corresponds to the size of an article, first detecting means for detecting the movement of the first remodelling means to the given position, and a first sub-controller for controlling the first drive means to cause the first remodelling means to be moved to the given position and for feeding a remodelling complete signal to the main controller in response to the detection by the first detecting means of the movement of the first remodelling means to the given position. The second article processing means comprises second remodelling means movable to a position which corresponds to the size of an article, second drive means for moving the second remodelling means to a given position dependent on the variety of the article, second detecting means for detecting the movement of the second remodelling means to the given position, and a second sub-controller for controlling the second drive means to move the second remodelling means and for feeding a remodelling complete signal to the main controller in response to the detection by the second detecting means of the movement of the second remodelling means to the given position. The main controller provides a signal which depends on the variety of the article to be processed to each of the sub-controllers, and enables the operation of the article processing system in response to the remodelling complete signals received from the respective sub-controllers.

According to a further feature of the invention, the article processing system constructed in the manner mentioned above is characterized in that the first article processing means includes a first sub-controller which controls the movement of the first remodelling means to a given position which corresponds to the size of an article and that the second article processing means includes a second sub-controller which controls the movement of the second remodelling means to a given position which corresponds to the size of the article while the main controller provides a signal dependent on the variety of the article to be processed to the respective sub-controllers, which in turn control the movement of the respective remodelling means on the basis of data which depends on the variety of the article supplied thereto.

In accordance with the first feature of the invention mentioned above, during the remodelling operation, the main controller provides a signal to the respective sub-controllers which depends on the variety of the article to be processed. The sub-controllers in turn cause the associated drive means to operate upon the respective remodelling means to move them to given positions which depend on the variety of the article.

When the associated detecting means detects the movement of the respective remodelling means to given positions, the sub-controllers feed a remodelling complete signal to the main controller, whereupon the main controller enables the operation of the article processing system. Accordingly, unless the respective remodelling means is moved to the given position, the article processing system cannot be operated, thus effectively preventing an inadvertence that the article processing system may be operated with a wrong remodelling in part thereof.

According to the second feature of the invention, the main controller delivers a signal dependent on the variety of the article to be processed to the respective sub-controllers, which in turn control the associated remodelling means on the basis of data which depend on the variety of the article supplied thereto, thus alleviating the load upon the main controller as compared with an arrangement in which the main controller stores all the data.

Above and other objects, features and advantages of the invention will become apparent from the following description of an embodiment thereof with reference to the drawing.

DESCRIPTION OF EMBODIMENT

Figure 1:
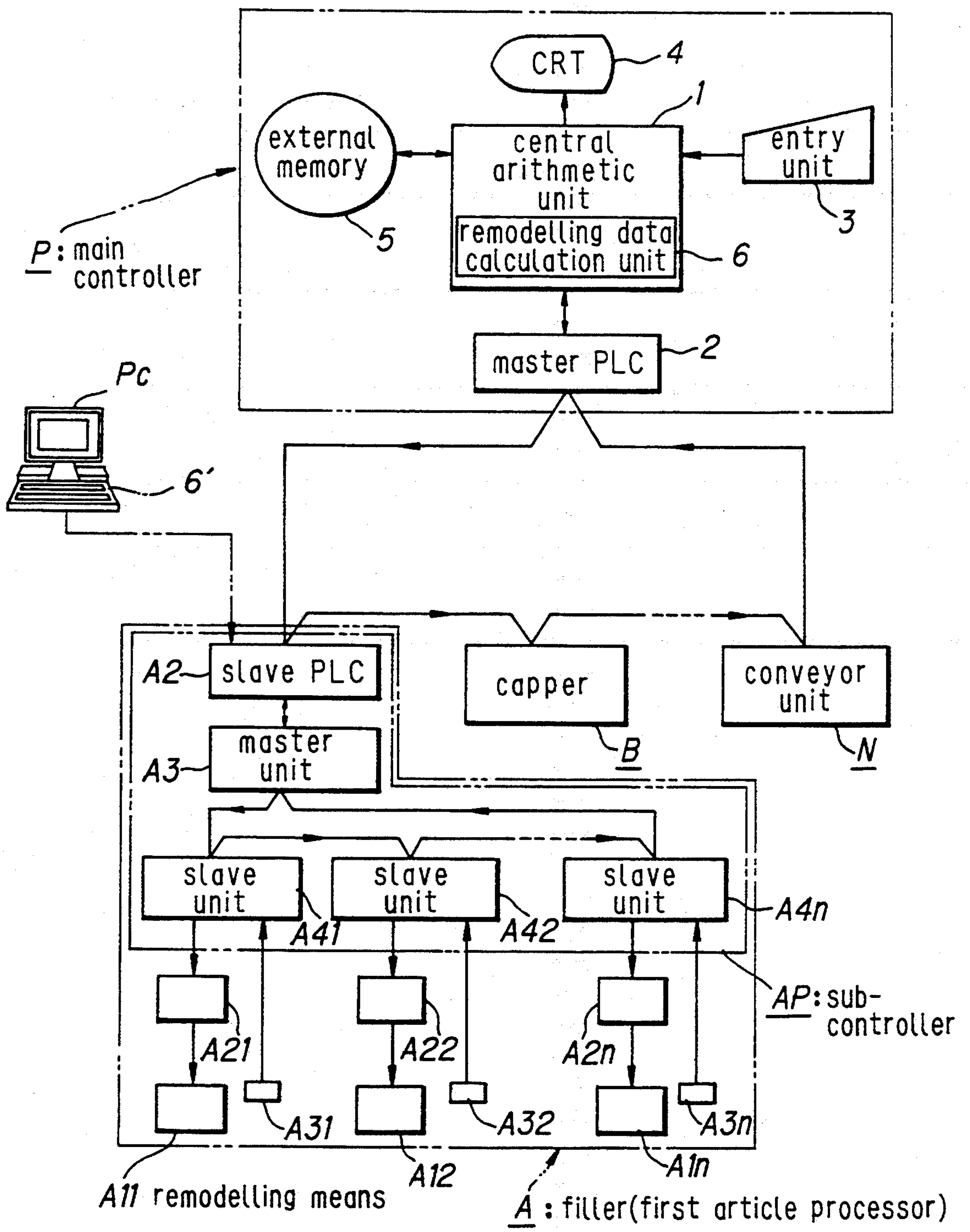
FIG. 1 is a schematic view of one embodiment of the invention.

Referring to FIG. 1, a first article processing means comprises a filler A which fills a vessel supplied thereto with a liquid to be filled therein. A second article processing means comprises a capper B which is disposed downstream of the filler A and provides a capping of vessels supplied from the filler A. Another article processing means is denoted as a conveyor unit N which provides a connection between the filler A and the capper B. Additional article processing means include a labeller, a caser or a conveyor unit which provides a connection therebetween. The operation of all of these article processing means A, B to N is controlled by a main controller P.

In the embodiment shown, a main controller P comprises a central arithmetic unit 1, a master programmable logic controller (PLC) 2, an entry device 3 for externally entering an operation start command or a remodelling command specifying the variety of an article to the central arithmetic unit 1, a CRT 4 for displacing an entry status, or a processing or operating status, and an external memory 5 for storing various data including the operation status.

When the variety of a vessel to be processed is changed in the first article processing means or filler A, it is necessary to alter the elevation of a filling liquid tank associated with the filler A, or to alter the stroke of a piston by changing the angular position of a skewed cam in a rocking cam mechanism in order to modify the amount to be filled for a filler of piston pump type, for example, and to alter the crosswise position of a guide which is used to guide the conveyance of a vessel within the filler, all in accordance with the size of the vessel.

A mechanism for changing the elevation of a filling liquid tank associated with a filler may be constructed as disclosed in Japanese Laid-Open Patent Application No. 3-43,395, for example. A mechanism for changing the angular position of the skewed cam may be constructed as disclosed in Japanese Utility Model Publication No. 59-42,399. Finally, a mechanism which changes the crosswise position of the guide which is used to guide the conveyance of the vessel may be constructed as disclosed in Japanese Laid-Open Patent Application No. 3-88,612, for example. In each of these mechanisms, a drive source such as a servo motor may be used to elevate the filling liquid tank, to modify the angular position of the cam or to displace the guide. A limit switch or the like may be used to detect whether or not the tank, the cam or the guide has been displaced to a given position.

Considering the filler A, by way of example, the elevatable filling liquid tank, the cam having a variable skew angle and the crosswise adjustable guide correspond to remodelling means A11, A12 - A1n shown which can be displaced in accordance with the size of a vessel. A drive source such as a servo motor including a drive for displacing the respective remodelling means A11, A12 - A1n correspond to drive means A21, A22 - A2n shown. Limit switches or encoders which detect the amount of rotation of the associated servo motor correspond to detecting means A31, A32 - A3n, respectively.

The filler A includes a sub-controller AP, which has data representing the designations of articles, for example, two vessels of different sizes as well as a plurality of sets of remodelling data corresponding to the respective article designation stored therein. The term "remodelling data" is intended to mean specific numerical values by which the individual remodelling means A11, A12 - A1n must be moved for each of the two vessels of different sizes. More specifically, the sub-controller AP of the filler A has a plurality of sets of remodelling data stored therein which indicate the designation of each vessel, the elevation of the filling liquid tank, the skew angle of the cam and the width of the guide corresponding to each designation.

The sub-controller AP also includes a slave programmable logic controller (PLC) A2, a master unit A3 for communicating a signal to or from the slave PLC, and slave units A41, A42 - A4n for communicating signals with the master unit A3 and for controlling the respective drive means A21, A22 - A2n.

When the designation of a particular vessel to be processed is transmitted from the main controller P to the sub-controller AP, the latter selects a set of remodelling data which corresponds to the designation, and controls the drive means A21, A22 - A2n in accordance with the selected remodelling data to move the respective remodelling means A11, A12 - A1n to given positions.

While not shown, the capper B or the conveyor unit N is also provided with respective remodelling means, drive means and detecting means in the similar manner as the filler A, and also includes an associated sub-controller which is arranged in the same manner as mentioned.

In the present embodiment, the central arithmetic unit 1 of the main controller P includes a remodelling data calculation unit 6 which is adapted to calculate remodelling data which may be required for a vessel of an additional size for which the sub-controller AP has no stored remodelling data. Specifically, for a vessel of an additional size for which the sub-controller of the respective article processing means (A, B - N) has no stored remodelling data, the remodelling data calculation unit 6 is operative, in response to required fundamental data representing the size, the shape or the like of a new vessel as well as the designation of such vessel applied to the main controller P, to calculate remodelling data which are required to move the remodelling means A11 - A1n, B11 - B1n, N11 - N1n of the filler, the capper B and the conveyor unit N in a manner as required for the new vessel.

The main controller P then stores remodelling data which has been calculated by the calculation unit 6 together with data designating the new vessel, and transmits such designation data and remodelling data to the respective sub-controllers AP.

Considering the filler A, by way of example, the individual slave units A41 - A4n of the associated sub-controller AP selects from the remodelling data transmitted from the main controller P only that remodelling data which is necessary to operate the respective remodelling means A11 - A1n of the filler A, and stores such remodelling data together with the designation data. In a similar manner as the filler A, the individual slave units of a sub-controller associated with the capper B or the conveyor unit N operate to select only remodelling data which is necessary to operate the remodelling means which are controlled by the respective slave units from the assembly of remodelling data transmitted from the main controller P, and stores such remodelling data together with its designation data.

Operation

With the above arrangement, the remodelling operation of various parts relating to a designated vessel, the remodelling data of which is already stored in the respective sub-controller, takes place while the article processing system ceases its operation. Initially, a remodelling command and designation data which designate a new vessel are entered through the entry unit 3 to be applied to the central arithmetic unit 1 of the main controller P. The master PLC 2 then provides the remodelling command signal and designation data to each slave PLC (A2) of the sub-controller AP associated with the filler A, the capper B and the conveyor unit N, respectively.

Upon receiving the remodelling command signal and the designation data for another article, the slave PLC (A2) of the sub-controller AP selects that remodelling data which corresponds to the designation data, and provides the remodelling command signal and the selected remodelling data to the slave units A41, A42 - A4n through the master unit A3. In response thereto, the individual slave units A41, A42 - A4n control the associated drive means A21, A22 - A2n to move the associated remodelling means A11, A12 - A1n to given positions in accordance with the remodelling data. When the movement of the remodelling means A11, A12 - A1n to the given positions is detected by the detecting means A31, A32 - A3n, the respective slave units A41, A42 - A4n deliver a remodelling complete signal to the master unit A3. In response thereto, the master unit A3 delivers a remodelling complete signal to the slave PLC (A2), which in turn delivers a remodelling complete signal to the master PLC 2. When the master PLC 2 receives the remodelling complete signals from the slave PLC's (A2) of all of the article processing means (A, B - N), it delivers a remodelling complete signal to the central arithmetic unit 1, which then enables the operation of the article processing system. Accordingly, the article processing system cannot be set in operation unless the remodelling means of all the article processing means (A, B - N) have been moved to given positions.

A remodelling operation of a vessel will now be considered in case remodelling data for such vessel is not previously stored in the sub-controller AP of one of the article processing means (A, B - N). In this instance, the entry unit 3 is used to enter a remodelling command, designation data of the new vessel, and fundamental data concerning the vessel, including the size, the shape or the like of the new vessel.

In response to the fundamental data mentioned above, the remodelling data calculation unit 6 in the central arithmetic unit 1 calculates remodelling data which are required to move the individual remodelling means A11 - A1n, B11 -B1n, N11 - N1n of the filler A, the capper B and the conveyor unit N, respectively, in a manner to correspond to the new vessel. Subsequently, the central arithmetic unit 1 stores the designation data of the new vessel as well as remodelling data which has been calculated by the calculation unit 6, and transmits such designation data and remodelling data to the respective sub-controllers AP through the master PLC 2.

Considering the filler A, for example, the individual slave units A41 - A4n of the sub-controller AP associated therewith selects only remodelling data which is required to operate the remodelling means A11 - A1n of the filler A from the remodelling data transmitted from the main controller P, and stores such data together with the designation data. In the similar manner, the slave units in the sub-controller associated with the capper B or the conveyor unit N operate to select required remodelling data and stores it together with the designation data.

In this manner, when the remodelling data for the new vessel is stored by the sub-controller of the article processing means (A, B - N), the remodelling means of the respective article processing means (A, B - N) undergo a remodelling operation in the manner mentioned above. Again, the article processing system cannot be set in operation unless all the remodelling means of all the article processing means (A, B - N) have been moved to given positions.

In the embodiment described above, by entering the designation data and fundamental data for vessels to be treated which have different sizes, including the size, the shape or the like of the vessel, into the main controller P, the remodelling data calculation unit 6 may be caused to calculate remodelling data which are required by the individual remodelling means of the article processing means. Accordingly, a task on the part of the operator can be simplified as compared with the conventional practice in which the operator is required to calculate remodelling data for all vessels for which the individual sub-controllers do not store remodelling data.

Second Embodiment

As an alternative, the remodelling data calculation unit 6 which is included in the main controller P in the first mentioned embodiment may be distributed in each of the sub-controllers AP. In this instance, the remodelling data calculation unit 6 which is provided in each of the sub-controllers AP is required to calculate only remodelling data which is required to operate the remodelling means which are controlled by the associated sub-controller AP. An arrangement can be made such that when the designation data of the vessel as well as fundamental data including the size, the shape or the like of the vessel are inputted to the main controller P, such designation data and the fundamental data be transmitted to the respective sub-controllers AP, the remodelling data calculation unit 6 of which is then operable to calculate remodelling data required for the individual remodelling means A11 - A1n in accordance with the fundamental data, and to store such data together with the designation data.

When so constructed, it is only necessary to enter the designation data for the new vessel to be processed and the remodelling command into the main controller P in order to accommodate for a change in the size of the vessel which is to be actually processed. In response thereto, the main controller P transmits the designation data and the remodelling command to the sub-controllers AP, which in turn control the individual drive means A21 - A2n in accordance with the remodelling data which corresponds to the designation data, thus moving the remodelling means A11 - A1n to positions which are appropriate to the selected vessel. This embodiment also achieves the similar functioning and effect as those achieved by the first embodiment.

Third Embodiment

In a third embodiment, rather than providing the remodelling data calculation unit 6 in either the main controller P or the individual sub-controllers AP, a personal computer PC may be provided with a remodelling data calculation unit 6' so that when designation data of a new vessel is inputted into the personal computer PC together with fundamental data specifying the size, the shape or the like of the vessel, the remodelling data calculation unit 6' is effective to calculate remodelling data which is required to move the individual remodelling means of the respective article processing means. During the entry of the designation data of the new vessel into the personal computer PC, such designation data of the vessel is also inputted into the main controller P.

The personal computer PC may be sequentially connected to the sub-controllers AP associated with the individual article processing means to transfer remodelling data which has been calculated by the remodelling data calculation unit 6' to the respective sub-controllers AP.

The sub-controller AP then selects required remodelling data for the associated remodelling means A11 - A1n, and stores it together with the designation data. Again, the similar functioning and effect as achieved by the first and the second embodiment can be achieved.

It is to be understood that during the remodelling operation mentioned above, the completion of a remodelling of the filler A or the capper B, or more specifically, a remodelling operation of various parts of the filler A or the capper B may be displayed on CRT 4.

It is to be understood that the arrangement of the main controller P or the sub-controller AP is exemplary only, and is not to be construed in a limiting sense.

While the invention has been shown and described above in connection with an embodiment thereof, it should be understood that a number of changes, modifications and substitutions therein will readily occur to one skilled in the art without departing from the spirit and scope of the invention defined by the appended claims.

What is claimed is:

1. An apparatus for automatic remodelling of an automatic article processing system, the article processing system including a first article processing means for processing an article supplied thereto, a second article processing means disposed downstream of the first article processing means for sequentially processing an article supplied from the first article processing means, and a main controller for controlling the operation of the first and the second article processing means, the apparatus comprising:

first remodelling means for moving to a position which corresponds to the size of an article, first drive means for moving the first remodelling means to a given position which corresponds to the size of an article, first detecting means for detecting the movement of the first remodelling means to the given position, and a first sub-controller for controlling the first drive means to move the first remodelling means and for feeding a remodelling complete signal to the main controller in response to a detection by the first detecting means of the movement of the first remodelling means to the given position, the first remodelling means, first drive means, first detecting means and first sub-controller all being associated with the first article processing means;

second remodelling means for moving to a position which corresponds to the size of an article, second drive means for moving the second remodelling means to a given position which corresponds to the variety of an article, second detecting means for detecting the movement of the second remodelling means to the given position, and a second sub-controller for controlling the second drive means to move the second remodelling means and for feeding a remodelling complete signal to the main controller in response to a detection by the second detecting means of the movement of the second remodelling means to the given position, the second remodelling means, second drive means, second detecting means and second sub-controller all being associated with the second article processing means; and the main controller including means for providing a signal which depends on the variety of an article to be processed to each of the first and second sub-controllers and means for enabling the operation of the article processing system only after receiving the remodelling complete signals from both of the first and second sub-controllers.

2. Apparatus according to claim 1 in which the main controller is provided with a remodelling data calculation unit which calculates remodelling data necessary to move the remodelling means as required by the article on the basis of fundamental data representing the size, the shape or the like of a new article when such fundamental data and designation data of another article are inputted to the main controller, the main controller providing the calculated remodelling data to each of the sub-controllers.

3. Apparatus according to claim 2 in which the remodelling data calculated by the remodelling data calculation unit is stored by the main controller.

4. Apparatus according to claim 2 in which the remodelling data calculated by the remodelling data calculation unit is stored by the respective sub-controller.

5. Apparatus according to claim 1 in which the main controller delivers designation data of another article and fundamental data representing the size, the shape or the like of the article to each of the sub-controllers, each of the sub-controllers being provided with a remodelling data calculation unit which calculates remodelling data necessary to move the associated remodelling means in a manner required by the article on the basis of the fundamental data, the sub-controller controlling the associated drive means in accordance with the calculated remodelling data.

6. Apparatus according to claim 5 in which the remodelling data calculated by the individual remodelling data calculation units is stored by the respective sub-controllers.

7. Apparatus according to claim. 1, further comprising a personal computer which includes a remodelling data calculation unit, designation data of another article and fundamental data representing the size, the shape or the like of the article being inputted to the personal computer, whereupon the remodelling data calculation unit calculates remodelling data necessary to move the remodelling means as required by the article on the basis of the fundamental data, the personal computer being connected to the main controller so that the designation data of another article and the remodelling data may be transmitted to the main controller, which then stores the designation data of another article and the remodelling data.

8. Apparatus according to claim 1, further comprising a personal computer which includes a remodelling data calculation unit, designation data of another article and fundamental data representing the size, the shape or the like of the article being inputted to the personal computer, whereupon the remodelling data calculation unit calculates remodelling data necessary to move the remodelling means as required by the article on the basis of the fundamental data, the personal computer being sequentially connected with each of the sub-controllers so that the designation data of another article and the remodelling data may be transmitted to each sub-controller, which then stores a section of the designation data of another article and the remodelling data which is required by the remodelling means controlled by the associated sub-controller.

9. An apparatus for automatic remodelling of automatic article processing system, the article processing system including a first article processing means for processing an article supplied thereto, a second article processing means disposed downstream of the first article processing means for sequentially processing an article supplied from the first article processing means, and a main controller for controlling the operation of the first and the second article processing means, the apparatus comprising:

first remodelling means for moving to a position which corresponds to the size of an article, first drive means for moving the first remodelling means to a given position which corresponds to the size of an article, first detecting means for detecting the movement of the first remodelling means to the given position, and a first sub-controller for controlling the first drive means to move the first remodelling means and for feeding a remodelling complete signal to the main controller in response to a detection by the first detecting means of the movement of the first remodelling means to the given position, the first remodelling means, first drive means, first detecting means and first sub-controller all being associated with the first article processing means;

second remodelling means for moving to a position which corresponds to the size of an article, second drive means for moving the second remodelling means to a given position which corresponds to the variety of an article, second detecting means for detecting the movement of the second remodelling means to the given position, and a second sub-controller for controlling the second drive means to move the second remodelling means and for feeding a remodelling complete signal to the main controller in response to a detection by the second detecting means of the movement of the second remodelling means to the given position, the second remodelling means, second drive means, second detecting means and second sub-controller all being associated with the second article processing means;

the main controller providing a signal which depends on the type of an article to be processed to each of the sub-controllers and for enabling the operation of the article processing system in response to remodelling complete signals received from the respective sub-controllers; and the first article processing means including a filling device which fills a vessel supplied thereto with a liquid, and the second article processing means including a capping device which attaches a cap to the vessel supplied from the filling device.

10. Apparatus according to claim 9 in which the first remodelling means includes means for changing the elevation of a filling liquid tank associated with the filling device, and means for altering a crosswise position of a guide which is used to guide said vessel within said filling device.

11. Apparatus according to claim 10 in which the first drive means includes a servo motor, and the first detecting means includes a limit switch which detects the amount of rotation of the servo motor.

12. Apparatus according to claim 9 in which the first remodelling means includes means for altering a stroke of a position by changing an angular position of a skewed cam in a rocking cam mechanism to modify an amount to be filled for a filler of a piston pump type.

13. An apparatus for automatic remodelling of automatic article processing system, the article processing system including a first article processing means for processing an article supplied thereto, a second article processing means disposed downstream of the first article processing means for sequentially processing an article supplied from the first article processing means, and a main controller for controlling the operation of the first and the second article processing means, the apparatus comprising:

first remodelling means for moving to a position which corresponds to the size of an article, first drive means for moving the first remodelling means to a given position which corresponds to the size of an article, first detecting means for detecting the movement of the first remodelling means to the given position, and a first sub-controller for controlling the first drive means to move the first remodelling means and for feeding a remodelling complete signal to the main controller in response to a detection by the first detecting means of the movement of the first remodelling means to the given position, the first remodelling means, first drive means, first detecting means and first sub-controller all being associated with the first article processing means;

second remodelling means for moving to a position which corresponds to the size of an article, second drive means for moving the second remodelling means to a given position which corresponds to the variety of an article, second detecting means for detecting the movement of the second remodelling means to the given position, and a second sub-controller for controlling the second drive means to move the second remodelling means and for feeding a remodelling complete signal to the main controller in response to a detection by the second detecting means of the movement of the second remodelling means to the given position, the second remodelling means, second drive means, second detecting means and second sub-controller all being associated with the second article processing means;

the main controller providing a signal which depends on the type of an article to be processed to each of the sub-controllers and for enabling the operation of the article processing system in response to remodelling complete signals received from the respective sub-controllers; and at least one of the first and second article processing means being selected from the group consisting of a vessel filling device, a vessel capping device, a vessel labeling device, a vessel casing device, and a conveying device.

* * * * *